Figures 1, 2:
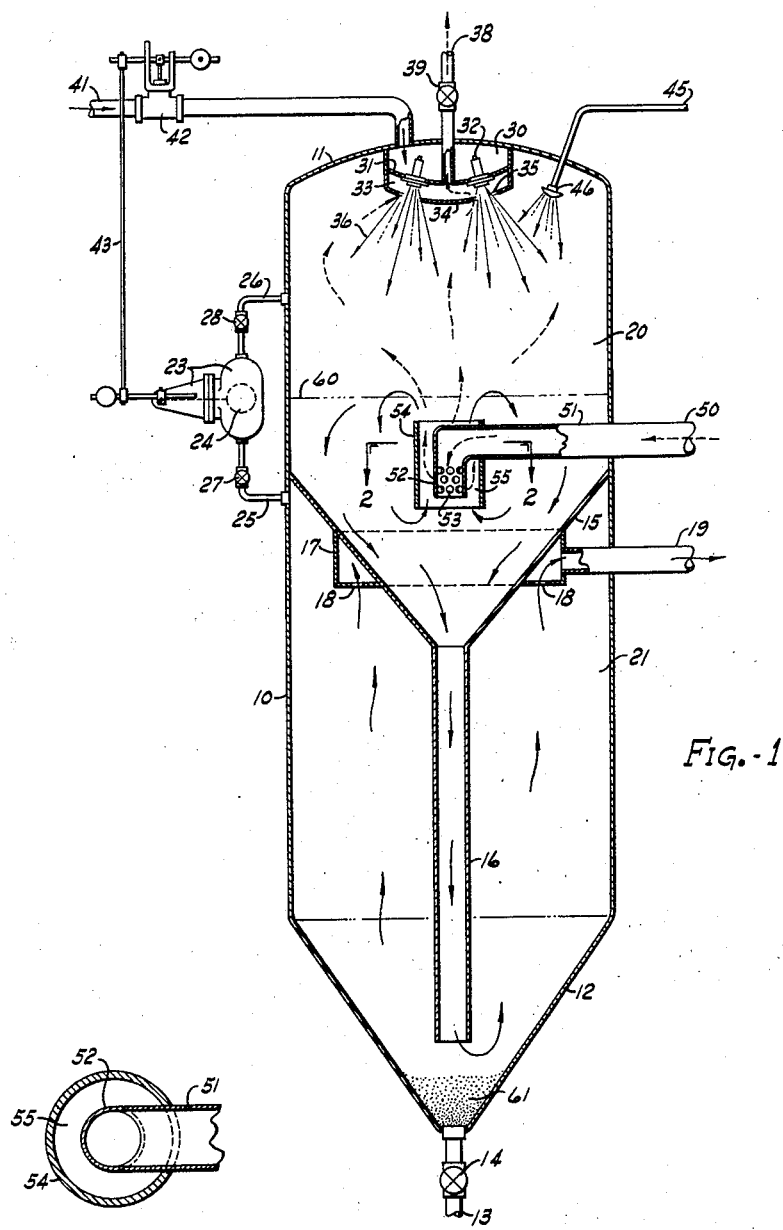

HERBERT L. BOWERS
INVENTOR.

BY
ATTORNEY

United States Patent Office 2,917,176
Patented Dec. 15, 1959

2,917,176

WATER DEAERATING MEANS

Herbert L. Bowers, Fairlawn, N.J., assignor to Pfaudler Permutit, Inc., New York, N.Y., a corporation of New York Application October 23, 1957, Serial No. 691,973

3 Claims. (Cl. 210—180)

This invention relates to improved water deaerating means in a hot process water softener, and it comprises a cylindrical shield within said hot process softener, a chamber formed by said shield and having an open top and an open bottom, said open top being located at an elevation which is a short distance below the elevation at which a definite water level is maintained in said hot process softener, a steam chest within said chamber, means for distributing steam from said steam chest into said chamber, and a supply pipe for steam connected with said steam chest, said steam supply pipe having a portion located below the elevation at which said definite water level is maintained, all as more fully described and as claimed hereinafter.

In a hot process water softener the water to be softened is sprayed through a steam space and softening chemicals are added to this water to react with the calcium, magnesium and iron dissolved in it to form precipitates which are then removed by sedimentation. The heating of the water, achieved by the aforesaid spraying through steam, not only results in a high degree of efficiency in the softening reactions but also removes the major portion of oxygen dissolved in the raw water.

The soft water produced in a hot process water softener is usually employed as boiler feed water. In such use a greater degree of oxygen removal or deaeration is often desired than can be obtained in the single stage spraying and heating of the water as described above.

It is an object of this invention to provide in a hot process softener a secondary deaeration stage which is efficient in operation, simple and inexpensive in construction and trouble-free in maintenance.

The manner in which this object is achieved is shown in the appended drawing in which:

Fig. 1 is a diagrammatic elevation, partly in cross section, of an apparatus in accordance with my invention; and Fig. 2 is a cross-sectional view along lines 2—2 of Fig. 1.

Referring now to the drawing, the tank 10 has a top 11 and a conical bottom 12 to which is connected a sludge outlet 13 provided with a valve 14. Within the tank 10 is a conical partition 15 continuing in a downcomer pipe 16 which extends into the conical bottom 12. Attached to the underside of the partition 15 is an outlet flume 17 provided with orifices 18 and communicating with an outlet pipe 19. The conical partition 15 divides the tank 10 into an upper reaction compartment 20 and a lower sedimentation compartment 21 which are in communication with each other through the downcomer pipe 16.

Adjacent to the reaction compartment 20 is a float cage 23 in which a float 24 is located. The lower and upper ends of the float cage 23 are in communication with the interior of tank 10 through pipes 25 and 26 with manual shut off valves 27 and 28, respectively.

On the underside of the tank top 11 is mounted a water inlet chamber 30 which has a dished bottom 31. On the bottom 31 are mounted spray valves 32 in such manner that they are located in an enclosure 33 which has a dished bottom 34 extending roughly parallel to the dished bottom 31 and provided with apertures 35. Each of the spray valves 32 produces a conically shaped stream of water 36 and the apertures 35 are arranged coaxially with the streams 36 but of such size that they provide annular openings surrounding the conically shaped streams 36. A vent pipe 38 leads from the enclosure 33 to the atmosphere through a valve 39.

A water inlet pipe 41 is connected with the water inlet chamber 30 and provided with a valve 42 which through linkage 43 is actuated by the float 24 to provide a definite water level 60 in the reaction compartment 20. An inlet pipe for chemicals 45 is provided with a spray head 46 which discharges into the reaction compartment 20.

In accordance with my invention a secondary deaeration stage is provided which comprises a steam inlet pipe 50 having a horizontal portion 51 leading to a vertical portion or steam chest 52. The vertical portion 52 is provided with orifices 53. Surrounding the vertical portion 52 is a shield 54 which provides a chamber 55 in which the vertical portion or steam chest 52 is located. The chamber 55 has an open bottom and an open top, the open top being located at an elevation which is a short distance below the water level 60. Preferably, the axis of the shield 54 coincides with the axis of tank 10, as shown.

In operation water is admitted through pipe 41, steam through pipe 50 and water softening chemicals through pipe 45. The flow of water through the apparatus is shown in Fig. 1 by solid arrows, while the flow of steam is indicated by broken arrows. The water entering through pipe 41 into the water inlet chamber 30 is discharged by the spray valves 32 in conical streams 36 which drop into the body of water maintained in the reaction compartment 20, the level 60 being maintained substantially constant by the action of the float 24 through linkage 43 on the valve 42. The chemical solution discharged by the spray head 46 is mixed with the water at the level 60 by agitation of the falling water. The steam admitted through pipe 50 is discharged through the orifices 53 into the chamber 55 and rises through the water therein because of its lower specific gravity. This upwardly directed steam flow within chamber 55 carries water with it and thus induces an upward flow of water through chamber 55. At the water level 60 the steam and water separate, the water returning in a downward flow outside the shield 54 and the steam rising upwardly to heat the water in the conically shaped streams 36. During such heating the steam is condensed and the uncondensable gases pass to the atmosphere through the enclosure 33 and the vent pipe 38 with the partly throttled valve 39.

The circulation of water induced by the steam discharging through orifices 53 brings the same particles of water repeatedly in contact with the incoming steam within the chamber 55, the water travelling upwardly within chamber 55 and downwardly without chamber 55, so that efficient and thorough deaeration is obtained.

Within the reaction compartment 20 the softening reactions take place and the water together with the newly formed precipitates then flows downwardly through the downcomer pipe 16 and upwardly through the sedimentation compartment 21 and orifices 18 into the outlet flume 17 and thence through pipe 19 to a point of use.

The precipitates formed by this softening reaction collect in the conical bottom 12, as shown at 61, and are periodically removed through the sludge outlet 13 by opening valve 14.

The efficiency of my second deaeration stage is demonstrated by the fact that when it was installed in an existing hot process softener, which originally had no secondary deaeration, it reduced the oxygen content of the softened water from approximately 0.7 part per million down to about 0.1 to 0.2 part per million; a very substantial improvement.

A secondary deaeration stage, in accordance with my invention, utilizes relatively few simple parts and, therefore, is inexpensive in cost. Furthermore, since there are no moving parts involved and since all parts are easily accessible in the reaction compartment, such secondary deaeration stage is trouble-free in operation and thus relatively free from maintenance problems.

While I have shown what I consider the preferred embodiment of my invention modifications may, of course, be made without departing from its spirit and reference is, therefore, made to the following claims for a definition of the scope of my invention.

What I claim is:

1. A hot process water softener comprising a tank, a reaction compartment in said tank, a supply pipe for water to be softened, water distributing means in the top portion of said tank and adapted to receive water from said supply pipe and discharge it into said reaction compartment, means for maintaining a definite water level in said reaction compartment, a vent connected with said tank in the vicinity of said water distributing means, means for supplying chemicals to said reaction compartment and means for withdrawing treated water from said tank, deaerating means comprising a cylindrical shield within said reaction compartment, a chamber formed by said shield and having an open top and an open bottom, said open top being located at an elevation which is a short distance below the elevation at which said definite water level is maintained, a steam chest within said chamber, means for distributing steam from said steam chest into said chamber, and a supply pipe for steam connected with said steam chest, said steam supply pipe passing horizontally through said shield to the outside of said tank below the elevation at which said definite water level is maintained.

2. The combination of claim 1, said steam chest having a vertical wall, and said steam distributing means being orifices in said vertical wall.

3. The combination of claim 1, the axis of said cylindrical shield coinciding with the axis of said tank.

References Cited in the file of this patent

UNITED STATES PATENTS

| | | |
|---|---|---|
| 584,628 | Dervaux | June 15, 1897 |
| 888,967 | Dewey | May 26, 1908 |
| 931,980 | Woodbury | Aug. 24, 1909 |
| 1,574,783 | Beth | Mar. 2, 1926 |
| 2,101,908 | Joos et al. | Dec. 14, 1937 |
| 2,241,873 | Yoder | May 13, 1941 |
| 2,243,582 | Soffe | May 27, 1941 |
| 2,719,032 | Schnur | Sept. 27, 1955 |